United States Patent
Kojima et al.

(10) Patent No.: US 11,143,240 B2
(45) Date of Patent: Oct. 12, 2021

(54) INNER RING UNIT AND TAPERED ROLLER BEARING

(71) Applicant: JTEKT CORPORATION, Osaka (JP)

(72) Inventors: Ichiro Kojima, Nara (JP); Youzou Taniguchi, Kashiwara (JP); Yuka Sato, Toyonaka (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/911,790

(22) Filed: Jun. 25, 2020

(65) Prior Publication Data

US 2020/0408260 A1    Dec. 31, 2020

(30) Foreign Application Priority Data

Jun. 27, 2019   (JP) ............................. JP2019-119711

(51) Int. Cl.
| | |
|---|---|
| *F16C 19/36* | (2006.01) |
| *F16C 33/46* | (2006.01) |
| *F16C 33/58* | (2006.01) |
| *F16C 33/36* | (2006.01) |

(52) U.S. Cl.
CPC .......... *F16C 33/585* (2013.01); *F16C 19/364* (2013.01); *F16C 33/36* (2013.01); *F16C 33/4676* (2013.01)

(58) Field of Classification Search
CPC .. F16C 19/364; F16C 33/366; F16C 33/4635; F16C 33/4676
See application file for complete search history.

(56) References Cited

U.S. PATENT DOCUMENTS

| | | | | |
|---|---|---|---|---|
| 2,946,633 | A  * | 7/1960 | Gothberg ............ | F16C 33/4611 384/576 |
| 3,477,773 | A  * | 11/1969 | Alston ................ | F16C 33/4605 384/576 |
| 9,194,430 | B2 * | 11/2015 | Yasuda ................. | F16C 33/467 |
| 2017/0321750 | A1 * | 11/2017 | Kamamoto ......... | F16C 33/6681 |

FOREIGN PATENT DOCUMENTS

| | | | | |
|---|---|---|---|---|
| DE | 102009053090 A1 * | 6/2011 | ............ | F16C 19/364 |
| JP | 2008196594 A  * | 8/2008 | .......... | F16C 33/4635 |
| JP | 2013-221592 A | 10/2013 | | |

* cited by examiner

*Primary Examiner* — Phillip A Johnson
(74) *Attorney, Agent, or Firm* — Oliff PLC (57) ABSTRACT

An inner ring unit includes an inner ring, a plurality of tapered rollers, and a cage having an annular shape. The cage includes a plurality of cage bars. The cage includes a stopper portion that is provided to protrude from an axial intermediate portion of the cage bar in the circumferential direction of the cage and configured to hinder the tapered rollers from falling off toward a radially outer side by bringing an axial intermediate portion on an outer peripheral surface of each tapered roller housed in a pocket into contact with the stopper portion. The axial intermediate portion on the outer peripheral surface of the tapered roller is a portion that is disposed on a one axial side and on the radially outer side of the tapered roller with respect to the center of gravity of the tapered roller.

4 Claims, 9 Drawing Sheets

ONE AXIAL SIDE

OTHER AXIAL SIDE

FIG. 4

ONE AXIAL SIDE

OTHER AXIAL SIDE

AXIAL DIRECTION ←

FIG. 6B

AXIAL DIRECTION ←

INNER RING UNIT AND TAPERED ROLLER BEARING

CROSS-REFERENCE TO RELATED APPLICATION

This application claims priority to Japanese Patent Application No. 2019-119711 filed on Jun. 27, 2019, incorporated herein by reference in its entirety.

BACKGROUND

1. Technical Field

The present disclosure relates to an inner ring unit and a tapered roller bearing.

2. Description of Related Art

Figure 9:
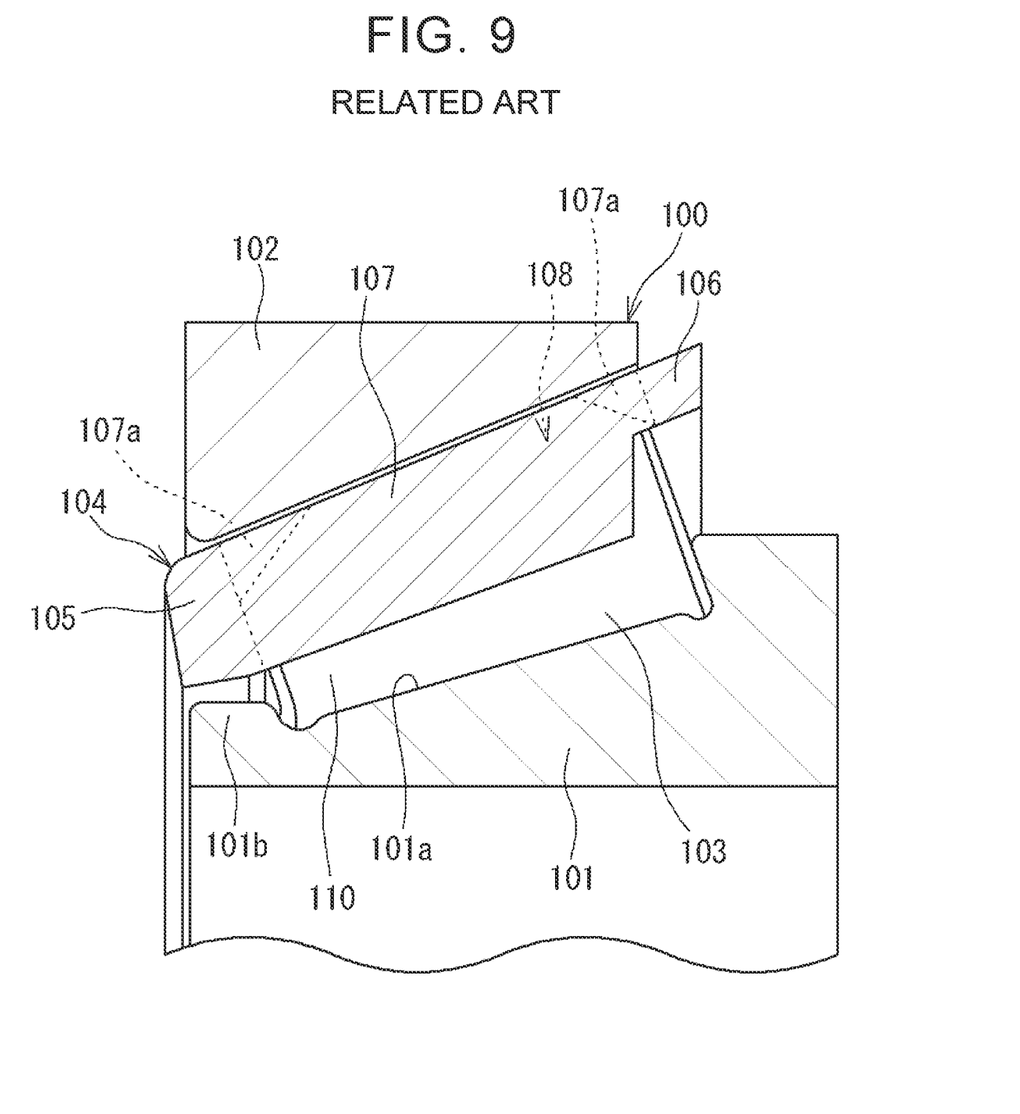
FIG. 9 is a longitudinal sectional view showing a tapered roller bearing of the related art.

FIG. 9 is a longitudinal sectional view showing a tapered roller bearing 100. The tapered roller bearing 100 includes an inner ring 101, an outer ring 102, a plurality of tapered rollers 103, and a cage 104 that has an annular shape and holds the tapered rollers 103 at intervals in the circumferential direction (for example, refer to Japanese Unexamined Patent Application Publication No. 2013-221592 (JP 2013-221592 A)).

The cage 104 includes a small-diameter annular body 105 disposed on a one axial side (the left side in FIG. 9), a large-diameter annular body 106 disposed on the other axial side (the right side in FIG. 9), and a plurality of cage bars 107 that connect the annular bodies 105, 106. A space defined between the annular bodies 105, 106 and between any two of the cage bars 107, 107 that are adjacent to each other in the circumferential direction serves as a pocket 108 that houses each of the tapered rollers 103.

SUMMARY

The tapered roller bearing 100 as shown in FIG. 9 can be assembled as follows. First, the tapered rollers 103 are housed in the respective pockets 108 in the cage 104. The cage 104 includes taper roller stopper portions 107a that are provided at respective ends of the cage bar 107 in an axial direction to hinder each tapered roller 103 housed in the pocket 108 from falling off from the cage 104 toward a radially outer side. In the state where the tapered rollers 103 are held in the cage 104 (in the respective pockets 108), the inner ring 101 is brought close to the cage 104 with the tapered rollers 103 housed therein from a small diameter side along the axial direction to position the tapered rollers 103 on an inner ring raceway surface 101a of the inner ring 101.

In the process of positioning of the tapered rollers 103 on the inner ring raceway surface 101a, a small-diameter portion 110 of each tapered roller 103 needs to be displaced toward the radially outer side to ride over a top face rib (hereinafter, referred to as a small rib) 101b of the inner ring 101. However, the tapered roller stopper 107a restricts the displacement of the small-diameter portion 110. The inner ring 101 is axially pressed against the cage 104 in which the tapered rollers 103 are held in the pockets 108 with a large force using a press machine, etc., and when the small-diameter portion 110 rides over the small rib 101b, the cage 104 is deformed (the diameter of the cage 104 is enlarged) and the tapered rollers 103 are displaced to and positioned on the inner ring raceway surface 101a. As a result, an inner ring unit in which the inner ring 101, the cage 104, and the tapered rollers 103 are integrated is obtained. The tapered roller bearing 100 is finished by assembling the outer ring 102 to the inner ring unit thus obtained.

However, as described above, when the small-diameter portion 110 of the tapered roller 103 rides over the small rib 101b of the inner ring 101, an excessively large force is applied to the cage 104. As a result of the above, when a strain caused by deformation of the cage 104 exceeds an allowable range, the cage 104 may be whitened or plastically deformed, or the cage 104 may be cracked.

The present disclosure provides an inner ring unit and a tapered roller bearing capable of reducing a strain caused by deformation of the cage in the assembly process.

An inner ring unit according to a first aspect of the present disclosure includes an inner ring, a plurality of tapered rollers, and a cage having an annular shape. The inner ring includes an inner ring raceway surface, a small rib, and a bottom face rib (hereinafter, referred to as a large rib). The inner ring raceway surface is on an outer periphery of the inner ring. The small rib is provided on a one axial side of the inner ring with respect to the inner ring raceway surface and protrudes toward a radially outer side. The large rib is provided on the other axial side of the inner ring with respect to the inner ring raceway surface and protrudes toward the radially outer side. The plurality of tapered rollers are arranged to roll on the inner ring raceway surface. The cage includes a small-diameter annular body, a large-diameter annular body, and a plurality of cage bars. The small-diameter annular body is provided on a one axial side of the cage and the large-diameter annular body is provided on the other axial side of the cage. The plurality of the cage bars are configured to connect the small-diameter annular body and the large-diameter annular body. The cage is configured to hold the tapered rollers in respective pockets, each of which is a space defined between the cage bars adjacent to each other in a circumferential direction of the cage between the large-diameter annular body and the small-diameter annular body. The cage includes a stopper portion that is provided to protrude in the circumferential direction of the cage at an axial intermediate portion of the cage bar and is configured to hinder each of the tapered rollers from falling off toward the radially outer side by bringing an axial intermediate portion on an outer peripheral surface of the tapered roller held in the pocket into contact with the stopper portion. The axial intermediate portion on the outer peripheral surface of the tapered roller is a portion that is disposed on a one axial side and on a radially outer side of the tapered roller with respect to a center of gravity of the tapered roller.

In the process of assembly of the inner ring unit, first, the tapered rollers are housed in the respective pockets of the cage, and then the inner ring is brought close to the cage provided with the tapered rollers in the axial direction to assemble the inner ring to the cage provided with the tapered rollers. In the process of assembling the inner ring to the cage provided with the tapered rollers, the small-diameter portion of each tapered roller needs to be displaced toward the radially outer side and ride over the small rib of the inner ring. With the inner ring unit of the first aspect of the present disclosure, the tapered roller is hindered from falling off toward the radially outer side by bringing the axial intermediate portion on the outer peripheral surface of the tapered roller into contact with the stopper portion provided on the cage bar of the cage when the small-diameter portion of the tapered roller rides over the small rib. This presses the inner ring against the cage in the axial direction and deforms the cage. However, because the axial intermediate portion on the outer peripheral surface of the tapered roller is a portion on the one axial side and on the radially outer side with respect to the center of gravity of the tapered roller, the large-diameter portion of the tapered roller swings toward the radially inner side and the small-diameter portion of the tapered roller swings toward the radially outer side with the stopper portion as a fulcrum. With this configuration, it is possible to reduce an amount of displacement toward the radially outer side that is required for causing the small-diameter portion of the tapered roller to ride over the small rib. Accordingly, the small-diameter portion of the tapered roller can ride over the small rib easily. Therefore, there is no need for pressing the inner ring against the cage in the axial direction with a large force, and it is thus possible to reduce the strain caused by deformation of the cage. Consequently, it is possible to suppress whitening or plastic deformation of the cage and occurrence of cracks on the cage.

In the inner ring unit according to the first aspect, the stopper portion may have a triangular prism shape in which an axial width is gradually decreased as the stopper portion protrudes from the cage bar in the circumferential direction of the cage, and a first surface that constitutes the triangular prism shape and that is disposed on the one axial side with respect to a protrusion edge of the stopper portion may be a contact surface that is brought into contact with the axial intermediate portion on the outer peripheral surface of the tapered roller. With the inner ring unit of the first aspect of the present disclosure, the axial intermediate portion on the outer peripheral surface of the tapered roller is not brought into contact with the protrusion edge of the stopper portion protruding in a triangular prism shape. This makes it possible to avoid stress concentration on the stopper portion.

In the inner ring unit according to the first aspect of the present disclosure, a rounded portion may be provided on an edge of the contact surface on a radially inner side. With the inner ring unit of the first aspect of the present disclosure, the axial intermediate portion on the outer peripheral surface of the tapered roller is brought into contact with the rounded portion provided at the edge of the contact surface on the radially inner side in the stopper portion. This makes it possible to further avoid stress concentration on the stopper portion.

A tapered roller bearing according to a second aspect of the present disclosure includes an inner ring unit and an outer ring. The inner ring unit includes an inner ring, a plurality of tapered rollers, and a cage having an annular shape. The inner ring includes an inner ring raceway surface, a small rib, and a large rib. The inner ring raceway surface is on an outer periphery of the inner ring. The small rib is provided on a one axial side of the inner ring with respect to the inner ring raceway surface and protrudes toward a radially outer side. The large rib is provided on the other axial side of the inner ring with respect to the inner ring raceway surface and protrudes toward the radially outer side. The plurality of tapered rollers are arranged to roll on the inner ring raceway surface. The cage includes a small-diameter annular body, a large-diameter annular body, and a plurality of cage bars. The small-diameter annular body is provided on the one axial side of the cage and the large-diameter annular body is provided on the other axial side. The plurality of cage bars is configured to connect the small-diameter annular body and the large-diameter annular body. The cage is configured to hold the tapered rollers in respective pockets, each of which is a space defined between the cage bars adjacent to each other in a circumferential direction of the cage between the large-diameter annular body and the small-diameter annular body. The cage includes a stopper portion that is provided to protrude in the circumferential direction of the cage at an axial intermediate portion of the cage bar and is configured to hinder each of the tapered rollers from falling off toward the radially outer side by bringing an axial intermediate portion on an outer peripheral surface of the tapered roller held in the pocket into contact with the stopper portion. The axial intermediate portion on the outer peripheral surface of the tapered roller is a portion that is disposed on a one axial side and on a radially outer side of the tapered roller with respect to a center of gravity of the tapered roller. The outer ring is provided on the radially outer side with respect to the inner ring of the inner ring unit.

In the tapered roller bearing according to the second aspect of the present disclosure, the stopper portion may have a triangular prism shape in which an axial width is gradually decreased as the stopper portion protrudes from the cage bar in the circumferential direction of the cage, and a first surface that constitutes the triangular prism shape and that is disposed on the one axial side with respect to a protrusion edge of the stopper portion may be a contact surface that is brought into contact with the axial intermediate portion on an outer peripheral surface of the tapered roller.

In the tapered roller bearing according to the second aspect of the present disclosure, a rounded portion may be provided on an edge of the contact surface on a radially inner side.

With the tapered roller bearing of the second aspect of the present disclosure, the same operation and effect as those of the inner ring unit as described above are exhibited.

With the inner ring unit of the first aspect and the tapered roller bearing of the second aspect of the present disclosure, a strain caused by deformation of the cage in the assembly process can be reduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Configuration of Tapered Roller Bearing

Figure 1:
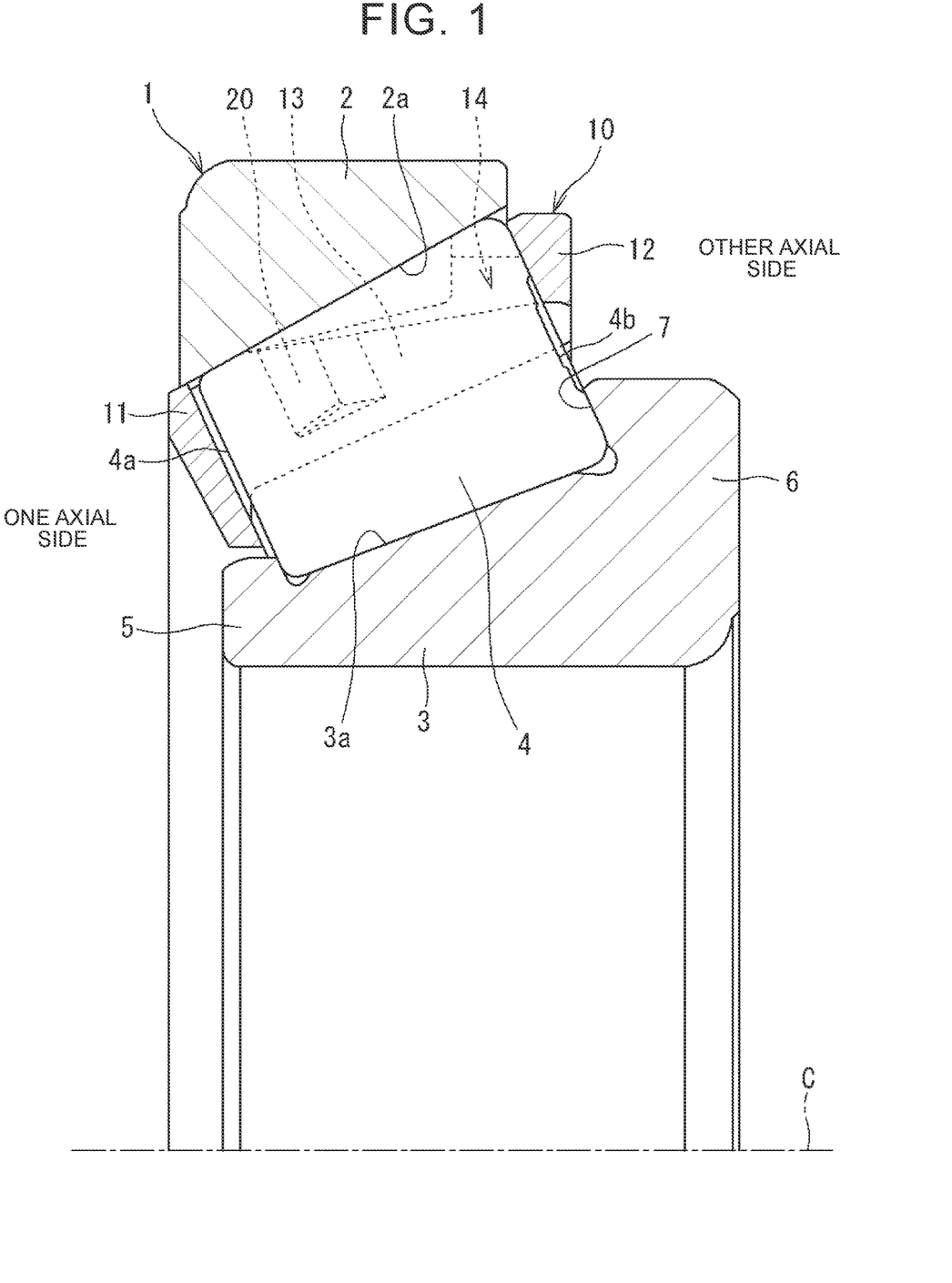
FIG. 1 is a sectional view showing a tapered roller bearing according to an embodiment of the present disclosure.

FIG. 1 is a sectional view showing a tapered roller bearing according to an embodiment of the present disclosure. A tapered roller bearing 1 includes an inner ring 3, an outer ring 2, a plurality of tapered rollers 4, and a cage 10 having an annular shape. The outer ring 2 is provided on a radially outer side of the inner ring 3. The tapered rollers 4 are interposed between the inner ring 3 and the outer ring 2. The cage 10 holds the tapered rollers 4. The tapered roller bearing 1 is lubricated with a lubricating oil (oil).

The inner ring 3 is an annular member made of bearing steel, steel for machine structural use, etc. The inner ring 3 includes, on its outer periphery, a tapered inner ring raceway surface 3a on which the plurality of tapered rollers 4 roll. The inner ring 3 further includes a small rib 5 and a large rib 6. The small rib 5 is provided on a one axial side of the inner ring raceway surface 3a (left side in FIG. 1) and protrudes toward the radially outer side. The large rib 6 is provided on the other axial side of the inner ring raceway surface 3a (right side in FIG. 1) and protrudes toward the radially outer side.

Each tapered roller 4 is made of, for example, bearing steel. The tapered rollers 4 roll on an outer ring raceway surface 2a provided on an inner periphery of the outer ring 2 and the inner ring raceway surface 3a. Each tapered roller 4 includes a small end surface 4a on the one axial side and a large end surface 4b on the other axial side. The small end surface has a small diameter, and the large end surface 4b has a large diameter. The large end surface 4b is in sliding contact with a rib surface 7 of the large rib 6 of the inner ring 3.

Figure 2:
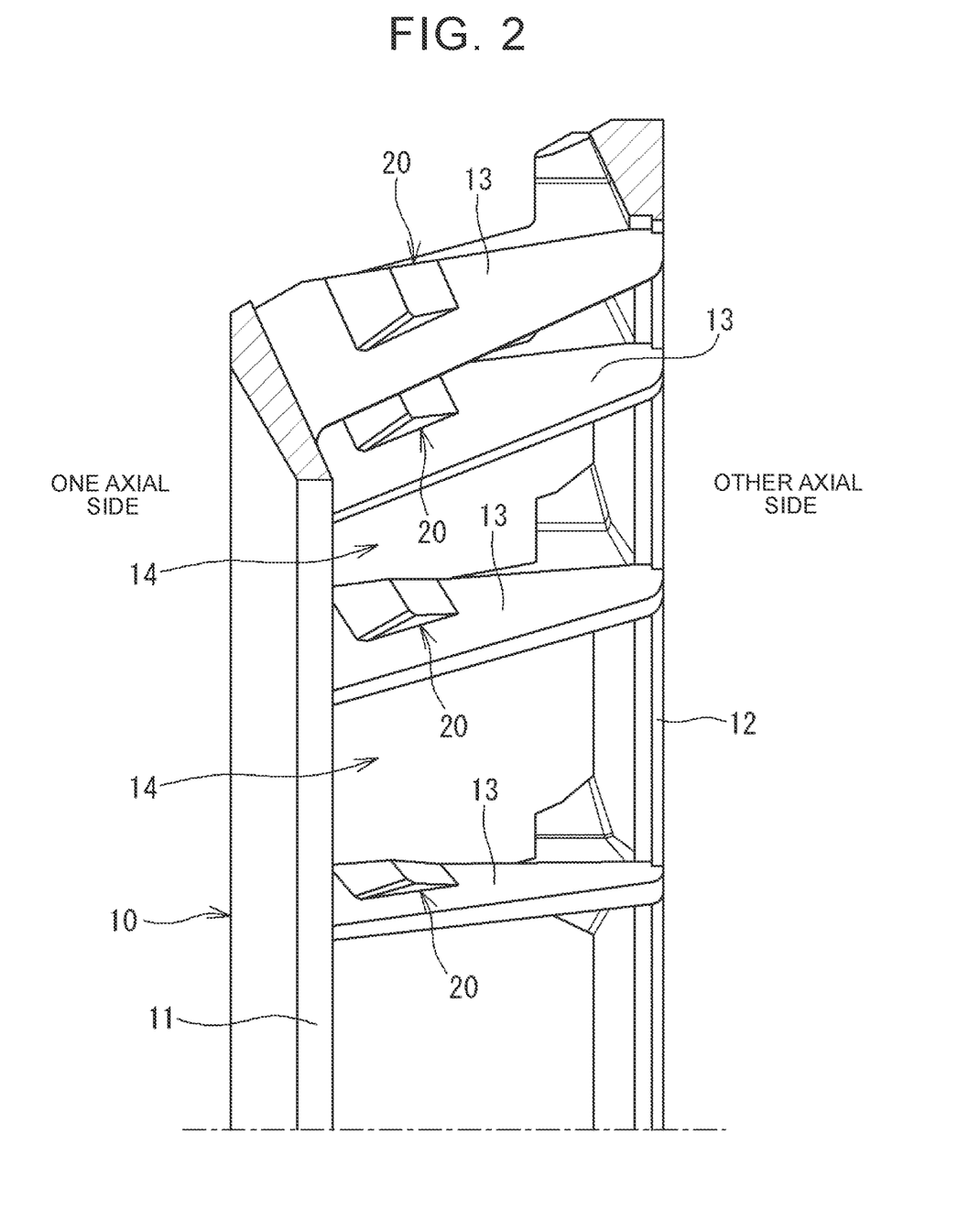
FIG. 2 is an explanatory diagram showing a part of a cage viewed from a radially inner side.

FIG. 2 is an explanatory diagram showing a part of the cage 10 viewed from a radially inner side. In FIGS. 1 and 2, the cage 10 includes a small-diameter annular body 11 on the one axial side, a large-diameter annular body 12 on the other axial side, and a plurality of cage bars 13 provided at intervals in the circumferential direction. The small-diameter annular body 11 and the large-diameter annular body 12 have an annular shape and are provided at a predetermined interval in the axial direction. The cage bars 13 connect the small-diameter annular body 11 and the large-diameter annular body 12.

A space is defined between the small-diameter annular body 11 and the large-diameter annular body 12 and between any two of the cage bars 13 that are adjacent to each other in the circumferential direction. This space serves as a pocket 14 to hold (or house) a corresponding one of the tapered rollers 4. The cage 10 is provided in an annular space defined between the inner ring 3 and the outer ring 2. In the cage 10, one tapered roller 4 is housed in each pocket 14, and the plurality of tapered rollers 4 are disposed and held at equal intervals in the circumferential direction. An axial length of the pocket 14 is set to a length that secures a clearance such that the tapered rollers 4 swing when the tapered roller bearing 1 to be described later is assembled (refer to FIGS. 7A and 8).

The cage 10 can be in sliding contact with the inner peripheral surface (outer ring raceway surface 2a) of the outer ring 2, and rotation of the cage 10 is guided by the outer ring 2. In other words, the tapered roller bearing 1 of this embodiment is a bearing of an outer-ring-guided type in which the cage 10 is guided by the outer ring 2. The cage 10 is made of synthetic resin and can be molded by injection molding. The cage 10 of this embodiment is made of polyphenylene sulfide resin (PPS) such that the cage 10 is resistant against the lubricating oil (has an oil resistance). Therefore, the cage 10 has sufficient hardness and is relatively unlikely to be elastically deformed but is likely to be cracked.

Figure 3:
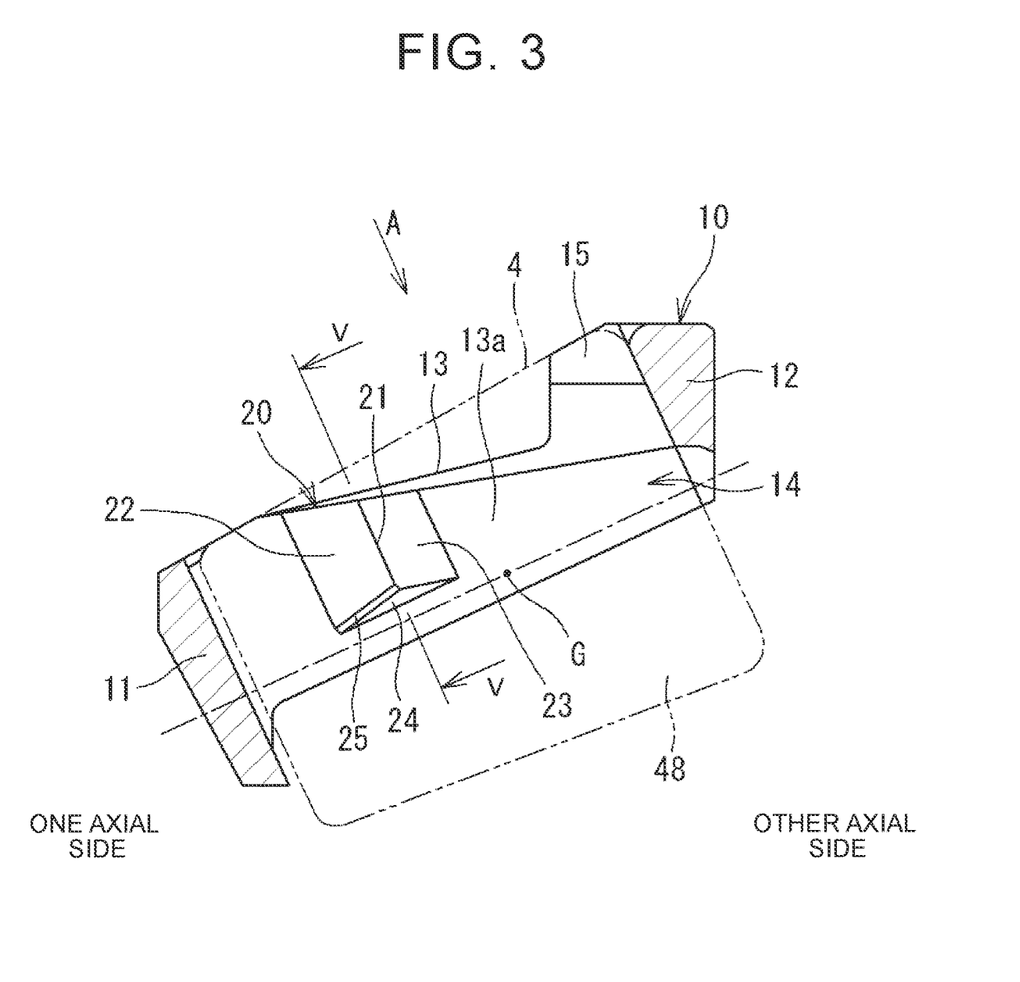
FIG. 3 is an enlarged sectional view of a main portion in FIG. 2.
Figure 4:
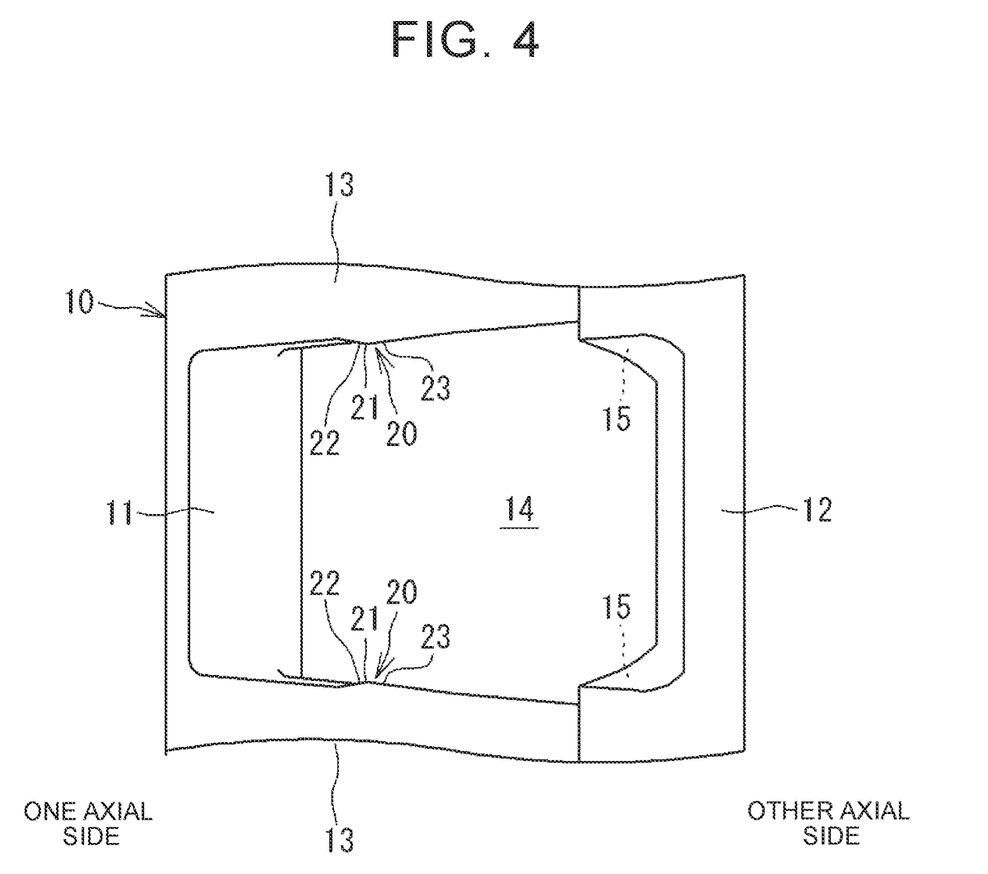
FIG. 4 is a diagram viewed in the direction of an arrow A in FIG. 3.

FIG. 3 is an enlarged sectional view of a main portion in FIG. 2. FIG. 4 is a diagram viewed in the direction of an arrow A in FIG. 3. In FIGS. 3 and 4, the cage 10 has a stopper portion 20 that is provided in an axially intermediate portion on a side surface 13a of each cage bar 13 and protrudes in the circumferential direction. The stopper portion 20 of the embodiment is integrally formed with the side surface 13a of the cage bar 13. The stopper portion 20 is brought into contact with an axially intermediate portion of the outer peripheral surface of the tapered roller 4 housed in the pocket 14 (hereinafter simply referred to as the axial intermediate portion of the tapered roller 4) such that the tapered roller 4 is hindered from falling off toward the radially outer side (falling off when the bearing is assembled).

The stopper portion 20 has a triangular prism shape in which an axial width is gradually reduced as the stopper portion 20 protrudes from the side surface 13a of the cage bar 13 in the circumferential direction. A first surface constitutes the triangular prism shape, and is provided on the one axial side with respect to a protrusion edge 21 of the stopper portion 20. The first surface is a contact surface 22 that is brought into contact with the axial intermediate portion of the tapered roller 4. The contact surface 22 has a trapezoidal shape in which a radial width is gradually increased from the protrusion edge 21 toward the one axial side. The contact surface 22 is disposed at a position on the one axial side and on the radially outer side with respect to the center of gravity G of the tapered roller 4 housed in the pocket 14. That is, the axial intermediate portion of the tapered roller 4 is disposed at a position on the one axial side and on the radially outer side with respect to the center of gravity G.

A second surface constitutes the triangular prism shape, and is provided on the other axial side with respect to the protrusion edge 21 of the stopper portion 20. The second surface is a non-contact surface 23 that is not brought into contact with the axial intermediate portion of the tapered roller 4. The non-contact surface 23 has a rectangular shape having a smaller area than that of the contact surface 22.

Figure 5:
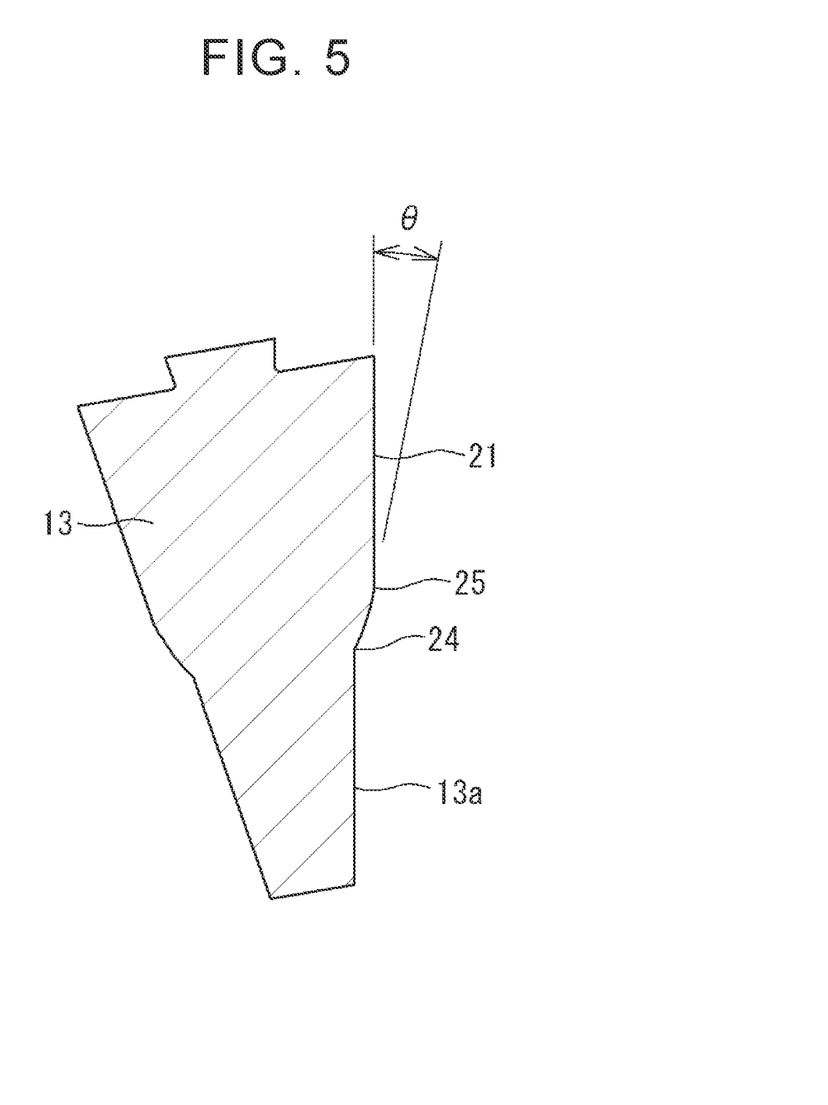
FIG. 5 is a sectional view taken along the line V-V and viewed from the direction of arrows in FIG. 3.

FIG. 5 is a sectional view taken along the line V-V and viewed from the direction of arrows in FIG. 3. In FIGS. 3 and 5, the protrusion edge 21 of the stopper portion 20 extends linearly in the radial direction. An inner end surface 24 of the stopper portion 20 on the radially inner side has a planar shape that inclines from a radial inner end of the protrusion edge 21 toward the radially inner side and toward the side surface 13a of the cage bar 13. An inclination angle θ with respect to the protrusion edge 21 of the inner end surface 24 is set such that a stress generated when the axial intermediate portion of the tapered roller 4 is brought into contact with the contact surface 22 is minimized. In the embodiment, the inclination angle θ is set to 20 degrees.

A rounded portion 25 is provided on an edge of the contact surface 22 on the radially inner side (a contact edge with the inner end surface 24) over an entire length in the axial direction so as to avoid stress concentration when the axial intermediate portion of the tapered roller 4 is brought into contact with the contact surface 22. A radius of curvature of the rounded portion 25 is set such that a stress generated when the axial intermediate portion of the tapered roller 4 is brought into contact with the contact surface 22 is minimized. In the embodiment, the radius of curvature is set to 1 mm.

In FIGS. 3 and 4, the cage 10 further includes a roller stopper portion 15 that is provided on the radially outer side of an end portion of the side surface 13a of the cage bar 13 on the other axial side and that protrudes in the circumferential direction. The roller stopper portion 15 of the embodiment is integrally formed on the side surface 13a of the cage bar 13. The roller stopper portion 15 is brought into contact with a large-diameter portion 48 on the outer peripheral surface of the tapered roller 4 housed in the pocket 14 such that the tapered roller 4 is hindered from falling off toward the radially outer side (falling off when the bearing is assembled).

The roller stopper portion 15 is provided at a position where the roller stopper portion 15 is not brought into contact with the tapered roller 4 even when the tapered roller 4 swings in the pocket 14 when the bearing is assembled. Note that, the cage 10 can sufficiently hinder the tapered roller 4 from falling off toward the radially outer side only with the stopper portion 20. Therefore, the cage 10 need not include the roller stopper portion 15.

Assembly Procedure of Tapered Roller Bearing

Figure 6A:
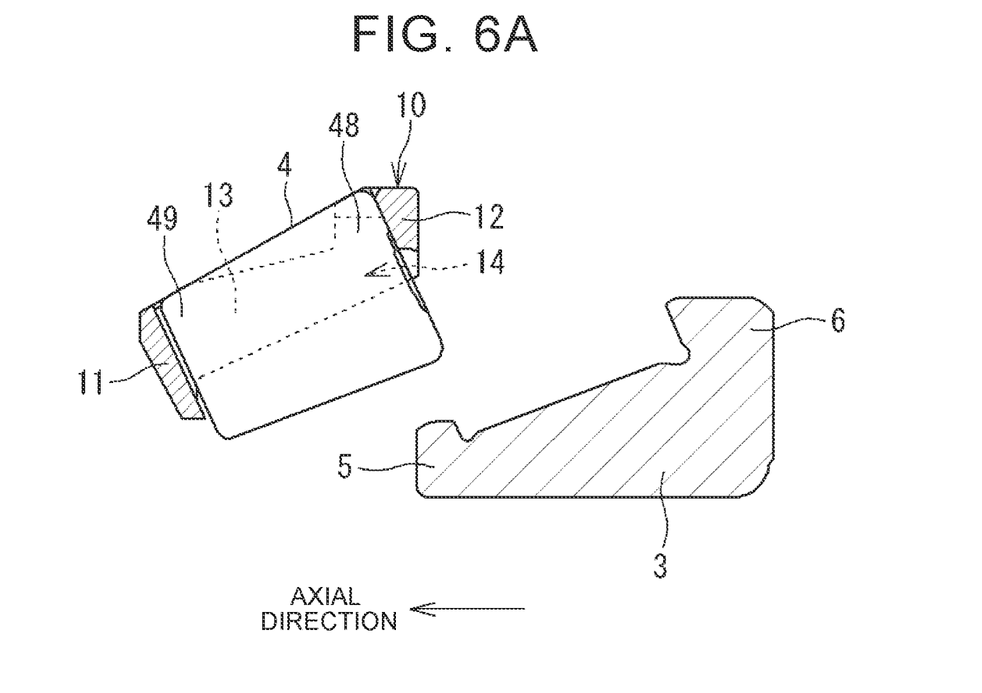
FIG. 6A is an explanatory diagram showing the assembly procedure of the tapered roller bearing.
Figure 6B:
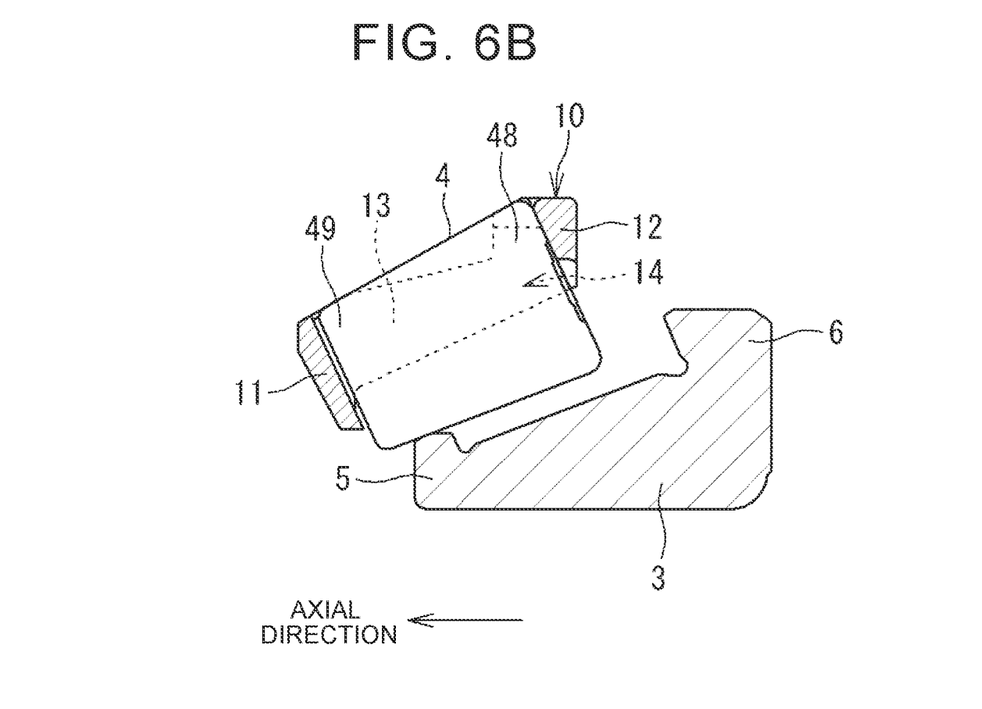
FIG. 6B is an explanatory diagram showing the assembly procedure of the tapered roller bearing.
Figure 7A:
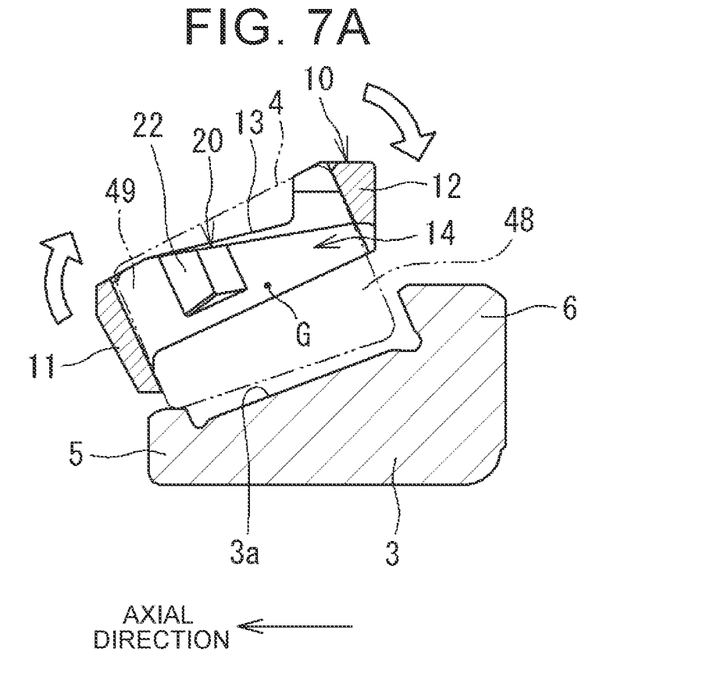
FIG. 7A is an explanatory diagram showing the assembly procedure of the tapered roller bearing.
Figure 7B:
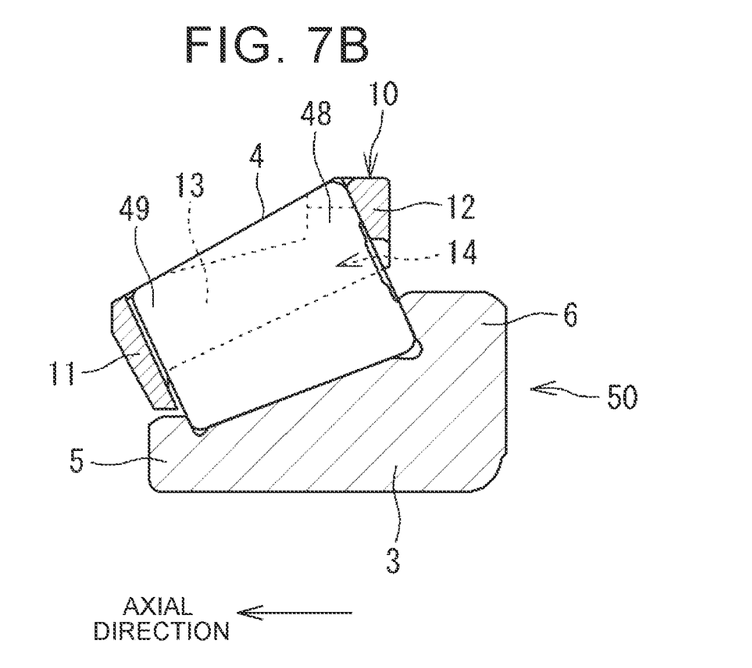
FIG. 7B is an explanatory diagram showing the assembly procedure of the tapered roller bearing.

FIGS. 6A, 6B and FIGS. 7A, 7B are explanatory diagrams showing an assembly procedure of the tapered roller bearing 1. In FIG. 6A, when assembling the tapered roller bearing 1, each tapered roller 4 is first placed into the corresponding pocket 14 from the inner peripheral side of the cage 10 to assemble the cage 10 and the tapered rollers 4, and then the inner ring 3 is assembled to the unit of the cage 10 and the tapered rollers 4 (FIG. 7B). During this assembly process, it is necessary to hinder the tapered roller 4 housed in the pocket 14 from falling off toward the radially outer side. Therefore, the cage 10 of the embodiment includes the stopper portions 20 as described above (refer to FIG. 3).

To assemble the tapered roller bearing 1, as shown in FIG. 6A, each taper roller 4 is housed in the corresponding pocket 14 of the cage 10 as described above. Next, the inner ring 3 is brought close to the unit of the cage 10 and the tapered rollers 4 from the small rib 5 side along the axial direction to assemble the inner ring 3 and the unit. In this process, as shown in FIG. 6B, when the small-diameter portion 49 of the tapered roller 4 is displaced toward the radially outer side and rides over the small rib 5 of the inner ring 3, the axial intermediate portion of the tapered roller 4 is brought into contact with the stopper portion 20 of the cage 10. This hinders the tapered roller 4 from falling off toward the radially outer side. Therefore, the cage 10 needs to be deformed by pressing the inner ring 3 against the cage 10 in the axial direction to cause the small-diameter portion 49 of the tapered roller 4 to ride over the small rib 5.

However, in the embodiment, the axial intermediate portion of the tapered roller 4 is a portion disposed on the one axial side and on the radially outer side with respect to the center of gravity G of the tapered roller 4. Therefore, as shown in FIG. 7A, the tapered roller 4 swings in a clockwise direction in FIG. 7A with the stopper portion 20 as a fulcrum. In other words, the large-diameter portion 48 of the tapered roller 4 swings toward the radially inner side and the small-diameter portion 49 also swings toward the radially outer side. With this configuration, it is possible to reduce an amount of displacement toward the radially outer side that is required for causing the small-diameter portion 49 of the tapered roller 4 to ride over the small rib 5. Accordingly, even when a force to press the inner ring 3 in the axial direction is small, the small-diameter portion 49 of the tapered roller 4 can ride over the small rib 5 easily.

As shown in FIG. 7B, when the inner ring 3 is assembled to the cage 10 with the tapered rollers 4 housed therein, the inner ring 3 cannot move in an opposite direction in the axial direction to the direction in which the inner ring 3 is pressed (hereinafter simply referred to as the "axially opposite direction") as described below. That is, as shown in FIG. 7B, the tapered roller 4 that is positioned on a vertically upper side of the cage 10 in the state where a central line C (refer to FIG. 1) of the cage 10 is aligned in a horizontal direction is held in contact with the inner ring raceway surface 3a disposed on the radially inner side due to its own weight. With this configuration, the inner ring 3 cannot move in the axially opposite direction as a vertically upper side of the small rib 5 of the inner ring 3 is caught by the tapered roller 4 disposed on the vertically upper side.

Figure 8:
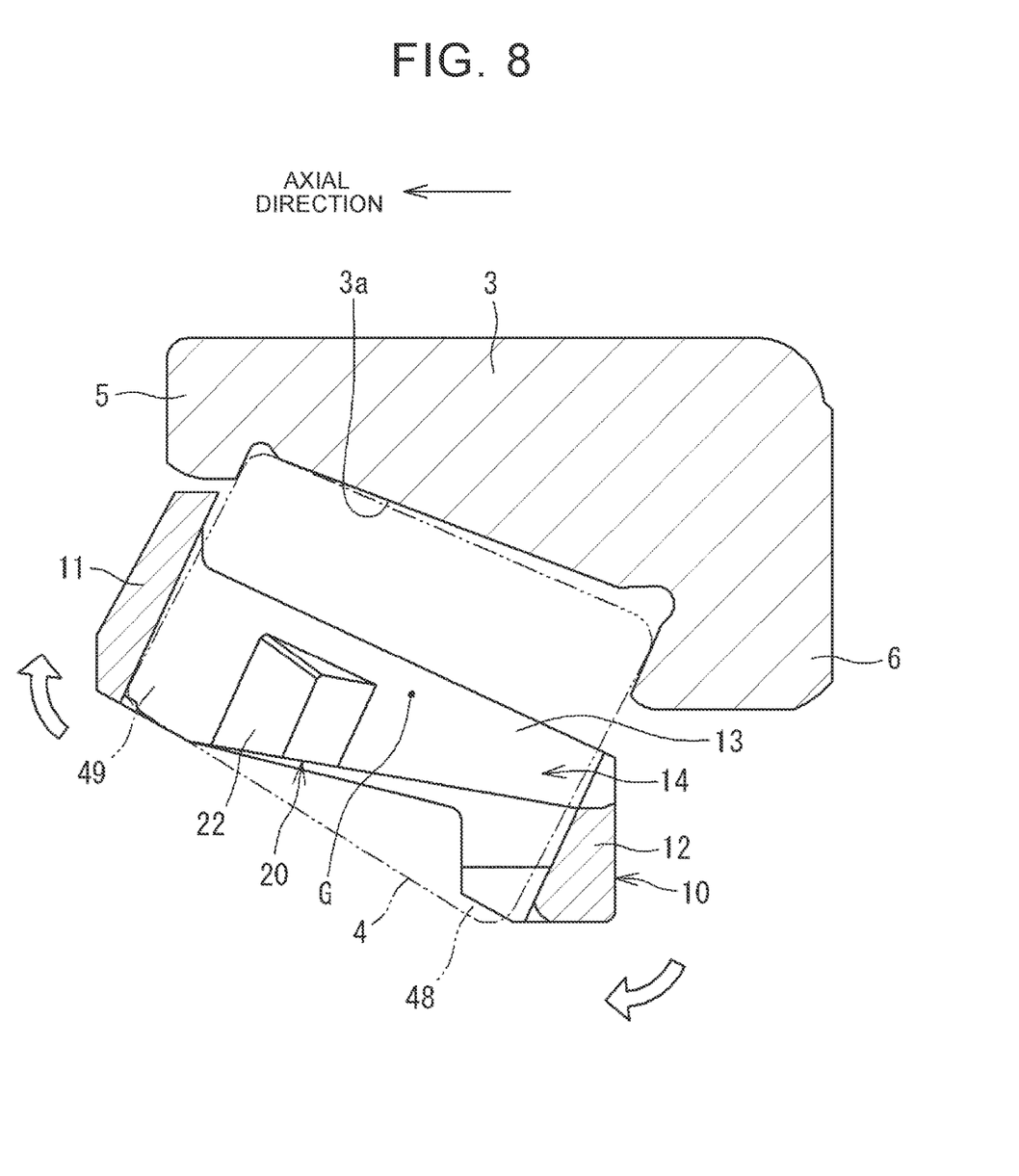
FIG. 8 is a sectional view showing a tapered roller positioned on a vertically lower side of the cage.

As shown in FIG. 8, the tapered roller 4 that is positioned on a vertically lower side of the cage 10 is displaced toward the radially outer side due to its own weight, and the axial intermediate portion of the tapered roller 4 is brought into contact with the contact surface 22 of the stopper portion 20. This causes the tapered roller 4 to swing in a clockwise direction in the FIG. 8 with the stopper portion 20 as a fulcrum. In other words, the large-diameter portion 48 of the tapered roller 4 swings toward the radially outer side and the small-diameter portion 49 of the tapered roller 4 also swings toward the radially inner side. With this configuration, the tapered roller 4 that is positioned on the vertically lower side of the cage 10 is held in the cage 10 with the small-diameter portion 49 in contact with the inner ring raceway surface 3a. Therefore, the inner ring 3 cannot move in the axially opposite direction as a vertically lower side of the small rib 5 of the inner ring 3 is caught by the tapered roller 4 disposed on the vertically lower side.

As described above, the inner ring unit 50 that is configured of the inner ring 3, the tapered rollers 4, and the cage 10 cannot be disassembled. This makes it possible to hinder the inner ring unit 50 from being disassembled. Further, the tapered roller bearing 1 is configured as shown in FIG. 1 by bringing the outer ring 2 close to the inner ring unit 50 in the axial direction and assembling the outer ring 2 to the inner ring unit 50 together.

As described above, according to the tapered roller bearing 1 of the embodiment, in the assembly process of the tapered roller bearing 1, the tapered rollers 4 are housed in the respective pockets 14 of the cage 10 and the inner ring 3 is brought close to the assembled cage 10 in the axial direction. In this process, when the small-diameter portion 49 of the tapered roller 4 is displaced toward the radially outer side and rides over the small rib 5 of the inner ring 3, the axial intermediate portion of the tapered roller 4 is brought into contact with the stopper portion 20 of the cage 10. This hinders the tapered roller 4 from falling off toward the radially outer side. Therefore, the cage 10 needs to be deformed by pressing the inner ring 3 against the cage 10 in the axial direction.

However, the axial intermediate portion of the tapered roller 4 is a portion disposed on the one axial side and on the radially outer side with respect to the center of gravity G of the tapered roller 4. Therefore, the large-diameter portion 48 of the tapered roller 4 swings toward the radially inner side and the small-diameter portion 49 of the tapered roller 4 swings toward the radially outer side, with the stopper portion 20 as a fulcrum. With this configuration, it is possible to reduce the amount of displacement toward the radially outer side that is required for causing the small-diameter portion 49 of the tapered roller 4 to ride over the small rib 5. Accordingly, the small-diameter portion 49 of the tapered roller 4 can ride over the small rib 5 easily.

Therefore, there is no need for pressing the inner ring 3 against the cage 10 in the axial direction with a large force, and it is thus possible to reduce the strain caused by deformation of the cage 10. Consequently, it is possible to suppress whitening or plastic deformation of the cage 10 and occurrence of cracks on the cage 10. In particular, as the size of the tapered roller bearing 1 increases, the force to press the inner ring 3 against the cage 10 in the axial direction also increases when the roller bearing 1 is assembled. Therefore, the present disclosure is advantageous in the case described herein.

Further, the axial intermediate portion of the tapered roller 4 is brought into contact with the contact surface 22 of the stopper portion 20 in a triangular prism shape that is disposed on the one axial side with respect to the protrusion edge 21 of the stopper portion 20, and is not brought into contact with the protrusion edge 21. This makes it possible to avoid stress concentration on the stopper portion 20.

Further, the axial intermediate portion of the tapered roller 4 is brought into contact with the rounded portion 25 that is provided at the edge of the contact surface 22 of the stopper portion 20 on the radially inner side. This makes it possible to further avoid stress concentration on the stopper portion 20.

The embodiments disclosed above are to be considered as illustrative and not restrictive in all respects. That is, the inner ring unit and the tapered roller bearing according to the present disclosure are not limited to the ones described in the above embodiments illustrated in the drawings, and various modifications may be made within the scope of the disclosure. For example, the shape of the stopper portion 20 may be any form other than the illustrated forms, and may be modified.

What is claimed is:

1. An inner ring unit, comprising:
    an inner ring including an inner ring raceway surface, a small rib, and a large rib that is larger than the small rib, the inner ring raceway surface being on an outer periphery of the inner ring, the small rib being provided on a first axial side of the inner ring with respect to the inner ring raceway surface and protruding toward a radially outer side, and the large rib being provided on a second axial side of the inner ring with respect to the inner ring raceway surface and protruding toward the radially outer side;
    a plurality of tapered rollers arranged to roll on the inner ring raceway surface; and
    a cage having an annular shape, the cage including a small-diameter annular body, a large-diameter annular body that is larger than the small-diameter annular body, and a plurality of cage bars, the small-diameter annular body being provided on a first axial side of the cage and the large-diameter annular body being provided on a second axial side of the cage, the plurality of the cage bars connecting the small-diameter annular body and the large-diameter annular body to each other, the cage configured to hold the tapered rollers in respective pockets, each of which is a space defined between the cage bars adjacent to each other in a circumferential direction of the cage between the large-diameter annular body and the small-diameter annular body, each of the cage bars including a stopper portion that protrudes in the circumferential direction of the cage at an axial intermediate portion of each of the cage bars and is configured to hinder each of the tapered rollers from falling off toward the radially outer side by bringing an axial intermediate portion on an outer peripheral surface of the tapered roller held in the pocket into contact with the stopper portion, and the axial intermediate portion on the outer peripheral surface of the tapered roller being disposed on a first axial side of the tapered roller and on a radially outer side of the tapered roller with respect to a center of gravity of the tapered roller,
    wherein each of the stopper portions has a triangular prism shape in which an axial width is gradually decreased as the stopper portion protrudes from each of the cage bars in the circumferential direction of the cage, and a first surface that constitutes the triangular prism shape and that is disposed on the first axial side of the cage with respect to a protrusion edge of the stopper portion is a contact surface that is brought into contact with the axial intermediate portion on the outer peripheral surface of the tapered roller.

2. The inner ring unit according to claim 1, wherein a rounded portion is provided on an edge of the contact surface on a radially inner side.

3. A tapered roller bearing, comprising:
    an inner ring unit including an inner ring, a plurality of tapered rollers, and a cage having an annular shape, the inner ring including an inner ring raceway surface, a small rib, and a large rib that is larger than the small rib, the inner ring raceway surface being on an outer periphery of the inner ring, the small rib being provided on a first axial side of the inner ring with respect to the inner ring raceway surface and protruding toward a radially outer side, the large rib being provided on a second axial side of the inner ring with respect to the inner ring raceway surface and protruding toward the radially outer side, the plurality of tapered rollers arranged to roll on the inner ring raceway surface, the cage including a small-diameter annular body, a large-diameter annular body that is larger than the small-diameter annular body, and a plurality of cage bars, the small-diameter annular body being provided on a first axial side of the cage and the large-diameter annular body being provided on a second axial side of the cage, the plurality of cage bars connecting the small-diameter annular body and the large-diameter annular body to each other, the cage configured to hold the tapered rollers in respective pockets, each of which is a space defined between the cage bars adjacent to each other in a circumferential direction of the cage between the large-diameter annular body and the small-diameter annular body, each of the cage bars including a stopper portion that protrudes in the circumferential direction of the cage at an axial intermediate portion of each of the cage bars and is configured to hinder each of the tapered rollers from falling off toward the radially outer side by bringing an axial intermediate portion on an outer peripheral surface of the tapered roller held in the pocket into contact with the stopper portion, the axial intermediate portion on the outer peripheral surface of the tapered roller being disposed on a first axial side of the tapered roller and on a radially outer side of the tapered roller with respect to a center of gravity of the tapered roller; and
    an outer ring that is provided on the radially outer side with respect to the inner ring of the inner ring unit,
    wherein each of the stopper portions has a triangular prism shape in which an axial width is gradually decreased as the stopper portion protrudes from each of the cage bars in the circumferential direction of the cage, and a first surface that constitutes the triangular prism shape and that is disposed on the first axial side of the cage with respect to a protrusion edge of the stopper portion is a contact surface that is brought into contact with the axial intermediate portion on the outer peripheral surface of the tapered roller.

4. The tapered roller bearing according to claim 3, wherein a rounded portion is provided on an edge of the contact surface on a radially inner side.

* * * * *